United States Patent Office 3,437,585
Patented Apr. 8, 1969

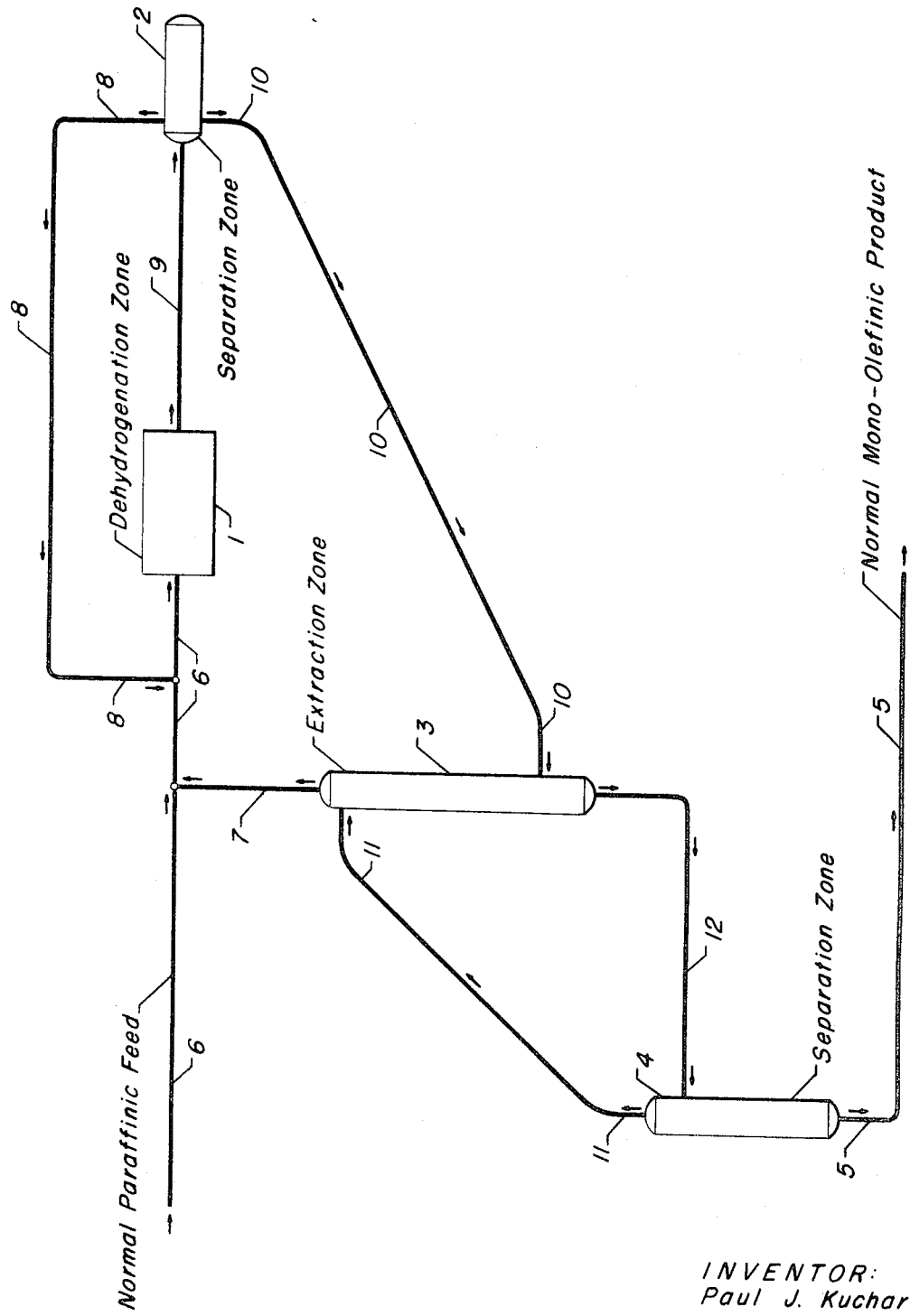

3,437,585
OLEFIN PRODUCTION AND SUBSEQUENT RECOVERY
Paul J. Kuchar, Des Plaines, Ill., assignor to Universal Oil Products Company, Des Plaines, Ill., a corporation of Delaware
Continuation-in-part of application Ser. No. 598,229, Dec. 1, 1966. This application Dec. 28, 1967, Ser. No. 694,280
Int. Cl. C10g 37/00, 13/28; C07c 5/18
U.S. Cl. 208—96                                    4 Claims

ABSTRACT OF THE DISCLOSURE

A process for the production and subsequent recovery of mono-olefinic hydrocarbons. A normal paraffnic hydrocarbon feed is contacted with a non-acidic alumina-containing catalyst at dehydrogenation conditions to produce normal mono-olefinic hydrocarbons. The dehydrogenated effluent is contacted with a selective solvent at extraction conditions to separate unreacted normal paraffinic hydrocarbons and recover normal mono-olefinic and alkyl aromatic hydrocarbons. The normal paraffinic hydrocarbons from the solvent extraction step are recycled to the dehydrogenation reactor.

Related application

This application is a continuation-in-part of my copending application, Ser. No. 598,229, filed Dec. 1, 1966, now abandoned, all the teachings of which copending application are incorporated herein by specific reference thereto.

Specification

This invention relates to a process for the production of normal mono-olefinic hydrocarbons. More specifically this invention relates to the dehydrogenation of normal paraffinic hydrocarbons to form normal olefins with subsequent recovery in a solvent extraction step.

Normal mono-olefins find use in the petrochemical industry as raw materials in the production of normal alcohols, straight chain alkyl substituted aromatics, etc. Probably the most promising future use of the normal mono-olefins is as a raw material in the production of "soft" detergents. These "soft" detergents, because of their straight chain alkyl substituted component, undergo bacterial degradation in the treatment of sewage, and do not appear as active detergents in the effluents of sewage treatment plants. With increased emphasis on elimination of polluted water in streams and lakes, the "soft" detergents are becoming important products. Consequently, the demand for normal mono-olefins is increasing.

It is an object of this invention to produce straight chain mono-olefins in a dehydrogenation zone wherein the normal paraffinic feed to the dehydrogenation zone is partially converted to an olefin. It is another object of this invention to separate the olefinic hydrocarbons from the unreacted paraffinic hydrocarbons. It is still a further object of this invention to separate unwanted aromatic hydrocarbons produced in the dehydrogenation zone from the unreacted paraffinic hydrocarbons in a solvent extraction zone.

An embodiment of this invention is found in a process for the production of normal mono-olefins which comprises the following steps: (a) passing a normal paraffin-containing hydrocarbon feed stream in admixture with a hydrogen containing gas stream through a dehydrogenation zone wherein said hydrocarbon feed and hydrogen are contacted with a catalytic composite at dehydrogenation conditions selected to produce a normal mono-olefinic hydrocarbon; (b) separating the resultant dehydrogenation zone effluent into a liquid phase and a hydrogen-rich gaseous phase; (c) recycling at least a portion of said gaseous phase to the dehydrogenation zone; (d) passing said liquid phase through an extraction zone wherein said liquid phase is contacted with a solvent selected from the group consisting of N-methyl 2-pyrrolydone, 2-pyrrolydone, butyrolactone at extraction conditions including a temperature within the range from about 70° F. to about 500° F. and a pressure within the range from about atmospheric to about 50 atmospheres to selectively separate said liquid phase into a raffinate stream comprising paraffinic hydrocarbons and an extract stream comprising olefinic and aromatic hydrocarbons; (e) recycling said raffinate stream to the dehydrogenation zone as a portion of said feed stream; (f) separating the extract stream into a solvent stream and a second hydrocarbon stream comprising olefinic and aromatic hydrocarbons; (g) recycling at least a portion of the solvent stream to said extraction zone; and, (h) recovering said second hydrocarbon stream.

Any suitable source of normal paraffins may be utilized as the feed stock for the process of the present invention and includes a naphtha fraction of a straight run petroleum distillate, the products of the Fischer-Tropsch reaction being paraffinic hydrocarbons in the $C_{10}$–$C_{22}$ range formed by the reductive condensation of carbon monoxide, the hydrogenated products of ethylene polymerization which are paraffins having from 10 to about 22 carbon atoms, and the hydrogenated fatty acids which, upon complete reduction, produce paraffinic hydrocarbons having a straight-chain configuration; etc. Other sources of paraffin hydrocarbons of whatever derivation are also contemplated herein as a source of paraffinic feed stock to the present process. The most widely available and generally preferred source of normal paraffins in the $C_{10}$ to $C_{22}$ range is kerosene, and more preferably the decane to dodecane fraction thereof boiling from about 330° F. to about 440° F. Most raw material sources of straight-chain paraffins, however, are mixtures containing a significant proportion of branched chain isomers in admixture with the desired normal paraffins. In order to obtain the necessary quantities of normal paraffin feed from the readily available mixtures of normal and non-normal paraffins a separation process may be required.

A suitable separation of the normal paraffins in the preferred range of chain length of 10 to 22 carbon atoms in the straight chain is a molecular sieve sorption process which can separate the normal and non-normal paraffinic hydrocarbons. A typical separation process is described in U.S. Patent 3,310,486 (Broughton et al.).

Referring to the accompanying figure, a schematic flow diagram of the process of this invention is shown. Fresh feed from a suitable separation process flows through line 6. The fresh feed comprises a normal paraffinic hydrocarbon in the preferred chain length. The fresh feed in line 6 flows to line 7 wherein the recycle paraffins from the extraction zone 3 are being returned to the dehydrogenation zone. The hydrocarbons flowing through line 7 comprise primarily straight chain paraffins.

A combined hydrocarbon stream from lines 6 and 7 continues in admixture through line 6 to line 8 where the gas phase from the separation zone 2 has been separated from the liquid phase flowing through line 9. The gas flowing through line 8 is transferred through line 8 by a compressor or other flow inducing device. The recycle gas in line 8 comprises a major concentration of hydrogen, with some light gases such as methane and ethane and heavier gases such as propane, butane, etc. The recycle gas in line 8 because of the predominant dehydrogenation reaction taking place in dehydrogenation zone 1 eventually will increase the plant pressure unless a pressure control device is used to vent off a portion of the gas product from the dehydrogenation zone. A suitable pressure control device is contemplated in the process of this invention either in recycle gas line 8 or on separator 2 to control plant pressure at a desired level.

It is contemplated that an external source of hydrogen may be used for obtaining the required gas flow in admixture with the feed. If an external source of hydrogen rich gas is used then recycle gas line 8 may not be required. Recycle gas operations in combination with an external source of hydrogen rich gas can be used in the operation of the process of this invention. External hydrogen rich gas when used enters the feed line 6 prior to the dehydrogenation zone 1.

The recycle gas flows through line 8 and mixed intimately with the combined hydrocarbon stream and continues to flow through line 6 to the dehydrogenation zone 1. It should be understood that the lines 7 and 8 can be interchanged and that the order in which the gas from line 8 and recycle parafins from line 7 meet the fresh feed flowing through line 6 is not an essential feature of this invention.

The material flowing through line 6 comprises normal paraffin feed, hydrogen and the normal parafin recycle and passes into the dehydrogenation zone which contains a dehydrogenation catalyst comprising an alumina support with platinum, lithium, and arsenic. A more retailed description of the catalyst used in the dehydrogenation zone can be found in U.S. Patent 3,291,755 (Haensel et al.).

It is preferred to effect the dehydrogenation at conditions including a temperature range from about 760° F. to about 1110° F., a pressure range from about atmospheric to about 100 p.s.i.g., a liquid hourly space velocity within the range from about 1.0 to about 40.0, and in the presence of hydrogen in an amount to result in a mol ratio of from about 1.1:1 to about 10:1, based on the total hydrocarbon charged to the dehydrogenation zone.

The dehydrogenation zone effluent flows through line 9 to separation zone 2 wherein the gas and liquid phases are separated. Line 8 carries the gas phase (recycle gas) from separator 2 to the inlet to the dehydrogenation zone. Separation zone 2 is operated at essentially the same pressure as dehydrogenation zone 1. Line 10 connects the extraction zone 3 and the separator 2 and carries in it the liquid phase from separator 2.

The liquid phase flowing through line 10 comprises unreacted normal paraffins, normal olefinic hydrocarbons and various products of the side reactions being effected in dehydrogenation zone 1.

The operation of the solvent extraction zone is carried out by introducing the liquid product flowing through line 10 into a lower portion of extraction zone 3 and introducing a solvent into an upper portion of said zone, both preferably in the liquid phase. Extraction zone 2 is equipped with suitable contacting means to promote efficient contact between the immiscible solvent and hydrocarbon phases, and to provide multistaging; stirring means, rotating discs, baffle plates, bubble decks, sieve decks, side to side pans, packing, etc., may be employed.

The following solvents are especially suitable to attain the separation of olefinic and aromatic hydrocarbons from paraffinic hydrocarbons in the $C_{10}$–$C_{22}$ carbon number range. These solvents are preferably selected from N-methyl 2-pyrrolidone, 2-pyrrolidone and butyrolactone. These solvents have the following chemical formulas:

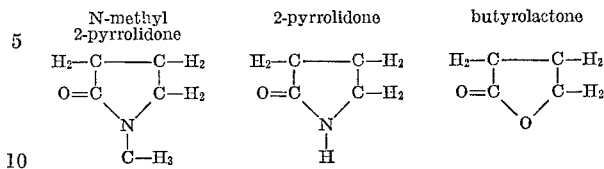

All of these solvents are available in commercial quantities in the open market. Although any of the above three solvents can be used in the above described separation with advantageous effectiveness, it is to be understood that these solvents are not necessarily equivalent in their effectiveness as a selective solvent for the above described separation. The solvent passes through line 11 downflow through the extraction zone wherein it dissolves a portion of the liquid phase in line 10 from separator 2. The extraction zone is maintained under conditions of temperature and pressure such that two immiscible liquid phases are maintained therein. Since the solvent possesses a selectivity for olefinic and aromatic hydrocarbons over saturated hydrocarbons, as the solvent phase moves downward through the extraction zone, the dissolved hydrocarbon portion of the solvent phase becomes progressively enriched in olefinic and aromatic hydrocarbons. The solvent phase is withdrawn from a lower part extraction zone whereupon it is sent to a second separation zone 4 through line 12 to separate the selectively absorbed olefinic and aromatic hydrocarbons from the solvent.

It is within the scope of this invention to add water or similar polar materials to the solvent to increase the selectivity of the solvent for the olefinic and aromatic hydrocarbons although this also results in a decrease in the solubility of the hydrocarbons in the solvent. Preferable water ranges are from about 0.1% to about 4.0% by weight. The temperatures employed in the extraction zone are from about 70 to 500° F. and preferably 125 to 400° F. depending upon the molecular weight and the water content of the solvent. It is preferable to avoid exposure of the solvent to oxygen or air to prevent undesirable side reactions and equipment fouling problems at these temperatures. The pressure employed is from atmoshperic to about 50 atmospheres with preferable pressure ranges of from about 3 to about 20 atmospheres.

The solvent phase flowing through line 12 is separated into a hydrocarbon portion of olefinic and aromtic hydrocarbons and a solvent portion in separation zone 4. This is attained either by introducing the solvent phase into a stripper maintained at lower pressure than the solvent phase and stripping the hydrocarbon out of the solvent (or vice versa depending on their respective boiling points) or by springing the dissolved hydrocarbons out of the solvent phase by contacting the solvent phase with sufficient water to separate out the hydrocarbons as a separate phase. This springing technique is preferably employed only when the hydrocarbons and the solvents have sufficient similarity in boiling point as to prevent economical separation by stripping techniques. If stripping techniques are employed to separate the solvent phase and the hydrocarbon phase, it is preferable to add steam to the stripping zone since this will tend to spring the olefinic and aromatic hydrocarbons from the solvent as well as serve as a stripping aid to carry the more volatile component up the stripping column.

Line 11 carries the solvent which has been separated from the extracted olefinic and aromatic hydrocarbons back to extraction zone 3 for reuse. It is to be understood that when the aforementioned springing technique is used to separate the solvent and hydrocarbon materials that a suitable water removel step is required before the solvent is recycled back to the extraction zone through line 11. The water separation step can be a stripping step, or other commonly used method to easily remove a portion or all of the water from the solvent. The separated olefinic and aromatic hydrocarbons flow through line 5 to be recovered as desired intermediate product.

It is contemplated in the process of this invention that the hydrocarbon flowing through line 5 can be fractionated into alkylaromatic and normal mono-olefinic streams if the boiling points of the two components are not close. It is also contemplated in the process of this invention that the hydrocarbon flowing through line 5 can be fed to a separate alkylation process wherein the normal mono-olefinic hydrocarbons can be alkylated with a selected aromatic to produce a monocyclic straight side chain alkylate.

Suitable aromatic compounds which can be used in the alkylation step include benzene, toluene, ethylbenzene, xylene, phenol and mononitro benzene. The alkylation reaction is effected in the presence of a suitable catalyst capable of promoting the condensation and reaction between the normal mono-olefinic and the aromatic hydrocarbons and is generally an inorganic material characterized as an acid-acting compound which catalyzes the alkyl transfer reaction involved in the process. Acid-acting inorganic compounds having alkylating activity include certain mineral acids, such as sulfuric acid containing not more than about 15 percent by weight water and preferably less than about 8 percent by weight of water, hydrofluoric acid of at least 83 percent concentration and containing less than about 10 percent by weight water, liquefied anhydrous hydrogen fluoride, anhydrous aluminum chloride and other acid acting catalysts, particularly of the Friedel-Crafts class of metal halides when the olefin-acting alkylating agent is an alkyl halide. The catalyst preferred for the present alkylation is hydrogen fluoride containing at least 83 percent and more preferably at least 95 percent hydrogen fluoride. Sulfuric acid of at least 85 percent concentration, up to 97 percent, is also a preferable catalyst.

In the dehydrogenation of normal paraffins to normal mono-olefins in order to minimize the production of normal dienes or other more unsaturated normal olefins it is necessary to effect the dehydrogenation operation at relatively mild conditions. This results in dehydrogenation reactor effluents containing generally from about 5 to about 20 wt. percent normal mono-olefins. The small amount of actual product (normal mono-olefin) formed at the milder conditions requires that as much as 95 wt. percent or higher of the dehydrogenation zone reactor effluent must be recycled back to the dehydrogenation reactor to be contacted again with the dehydrogenation catalyst.

It has been found that at preferred dehydrogenation conditions previously described herein, there is production of non-normal hydrocarbons comprising aromatic compounds. A charge stock containing 28 vol. percent normal $C_{11}$ paraffin, 33 vol. percent N $Cl_{12}$ paraffin, 26 vol. percent N $C_{13}$ paraffin and 13 vol. percent N $C_{14}$ paraffin was charged at the preferred operating conditions to a dehydrogenation reactor containing the aforementioned dehydrogenation catalyst. Mass spectrometer analysis of the dehydrogenation zone effluent (line 9) showed that there was a small amount of aromatic production which amounted to about 0.6 wt. percent of the feed to the dehydrogenation reactor. The primary aromatic material produced was an alkylaryl hydrocarbon which was predominantly a monocyclic alkylaryl hydrocarbon with the alkyl side chain comprising normal and non-normal structures. Some naphthalenic hydrocarbons were also detected, but not in concentrations as large as the monocyclic alkylaryl hydrocarbons. It was also found that when a recycle stream (corresponding to line 7 of FIGURE 1) containing as much as 0.6 wt. percent alkyl aromatic compounds in a predominantly paraffinic mixture was passed through the dehydrogenation zone contacting the dehydrogenation catalyst at the preferred operating conditions that there was a noticeable loss in catalytic activity. The activity loss which resulted in a decrease in the quantity of normal mono-olefins produced could be corrected by increasing the catalyst temperature. Increasing the catalyst temperature brought the conversion level of normal paraffins to normal mono-olefins to about the same level attained before the alkyl aromatic material was present in the recycle paraffin stream. The temperature increase in the dehydrogenation zone reactor caused the production of by-product aromatic compounds to increase slightly.

In choosing an extraction zone solvent that selectively separates paraffinic hydrocarbons from olefinic and aromatic hydrocarbons the dehydrogenation zone catalyst is protected from contact with aromatic hydrocarbons from the paraffin recycle stream (line 7). Recycling an essentially aromatic free paraffin stream back to the dehydrogenation zone reduces the temperature requirements for a given normal mono-olefin conversion. The lower temperature requirements in the hydrogenation zone reduce the severity of operations which consequently reduces coke lay down on the dehydrogenation zone catalyst and the quantity of side reactions (aromatic production) taking place.

It is the unique feature of the extraction zone in removing the olefinic and aromatic hydrocarbons from the dihydrogenation zone effluent that allows prolonged catalyst life in the dehydrogenation zone.

The above specification clearly illustrates the use of the present invention for the production and recovery of normal mono-olefinic hydrocarbons and the benefits afforded by the use of said invention.

I claim as my invention:

1. A process for the production of normal monoolefins which comprises the following steps:
   (a) passing a normal paraffin-containing hydrocarbon feed stream in admixture with a hydrogen containing gas stream through a dehydrogenation zone wherein said hydrocarbon feed and hydrogen are contacted with a catalytic composite at dehydrogenation conditions selected to produce a normal mono-olefinic hydrocarbon admixed with aromatic hydrocarbon;
   (b) separating the resultant dehydrogenation zone effluent into a liquid phase and a hydrogen-rich gaseous phase;
   (c) recycling at least a portion of fluid gaseous phase to the dehydrogenation zone;
   (d) passing said total liquid phase through an extraction zone wherein said liquid phase is contacted with a solvent selected from the group consisting of N-methyl 2-pyrrolydone, 2-pyrrolidone, butyrolactone at extraction conditions including a temperature within the range from about 70° F. to about 500° F. and a pressure within the range from about atmospheric to about 50 atmospheres to selectively separate said liquid phase into a raffinate stream comprising paraffinic hydrocarbons and an extract stream comprising olefinic and aromatic hydrocarbons;
   (e) recycling said raffinate stream to the dehydrogenation zone as a portion of said feed stream;
   (f) separating the extract stream into a solvent stream and a second hydrocarbon stream comprising olefinic and aromatic hydrocarbons;
   (g) recycling at least a portion of the solvent stream to said extraction zone; and
   (h) recovering said second hydrocarbon stream.

2. The process of claim 1 further characterized in that said paraffin-containing feed stream comprises normal paraffins having from about 10 to about 22 carbon atoms per molecule.

3. The process of claim 1 further characterized in that said catalytic composite comprises alumina, from about 0.05% to about 5.0% by weight of a Group VIII metallic component and a metallic component selected from the group consisting of arsenic, antimony, bismuth in an atomic ratio to the Group VIII metallic component of from about 0.20 to about 0.45.

4. The process of claim 1 further characterized in that said dehydrogenation conditions include a temperature range from about 760° F. to about 1110° F., and a pressure range from about atmospheric to about 100 p.s.i.g.

References Cited

UNITED STATES PATENTS

| | | | |
|---|---|---|---|
| 2,855,446 | 10/1958 | Findlay | 260—683.3 |
| 2,956,006 | 10/1960 | Wilson et al. | 208—96 |
| 3,082,271 | 3/1963 | Weitz et al. | 260—677 |
| 3,148,228 | 9/1964 | Franz et al. | 260—683.3 |
| 3,200,165 | 8/1965 | Eisenlohr et al. | 208—96 |
| 3,328,289 | 6/1967 | Streed | 208—96 |
| 3,291,755 | 12/1966 | Haensel et al. | 252—464 |

HERBERT LEVINE, *Primary Examiner.*

U.S. Cl. X.R.

208—325, 326; 260—683.3